F. B. TOTMAN.
PORTABLE PAVING PLANT.
APPLICATION FILED DEC. 7, 1917.
1,341,948.
Patented June 1, 1920.
3 SHEETS—SHEET 1.
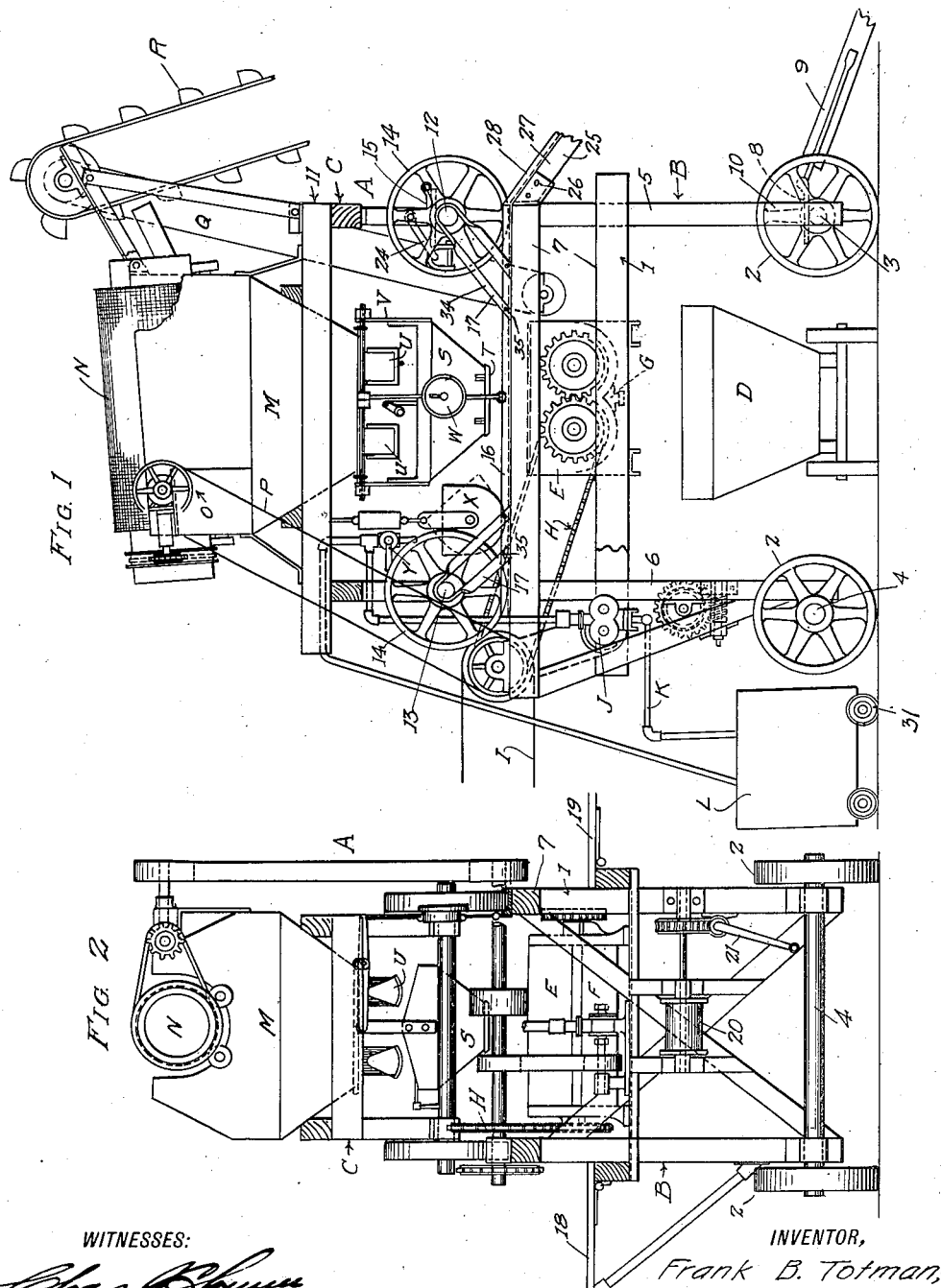
WITNESSES:
INVENTOR,
Frank B. Totman;
BY
ATTORNEY.

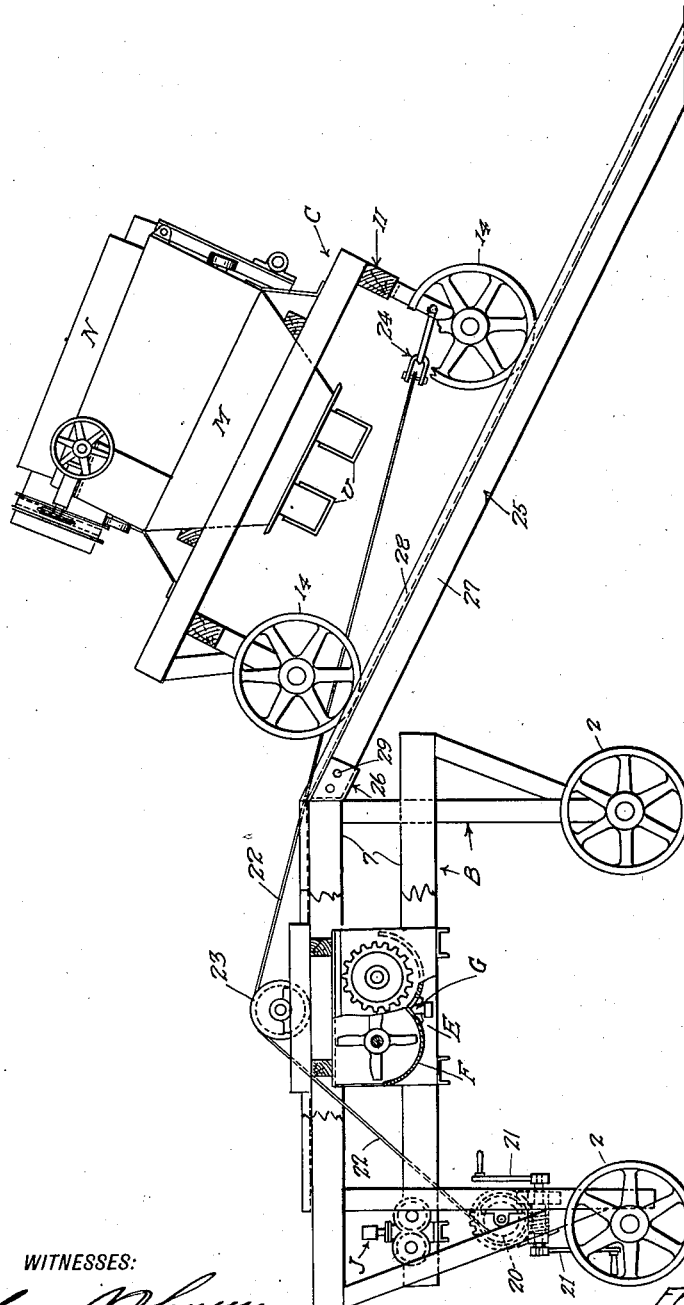

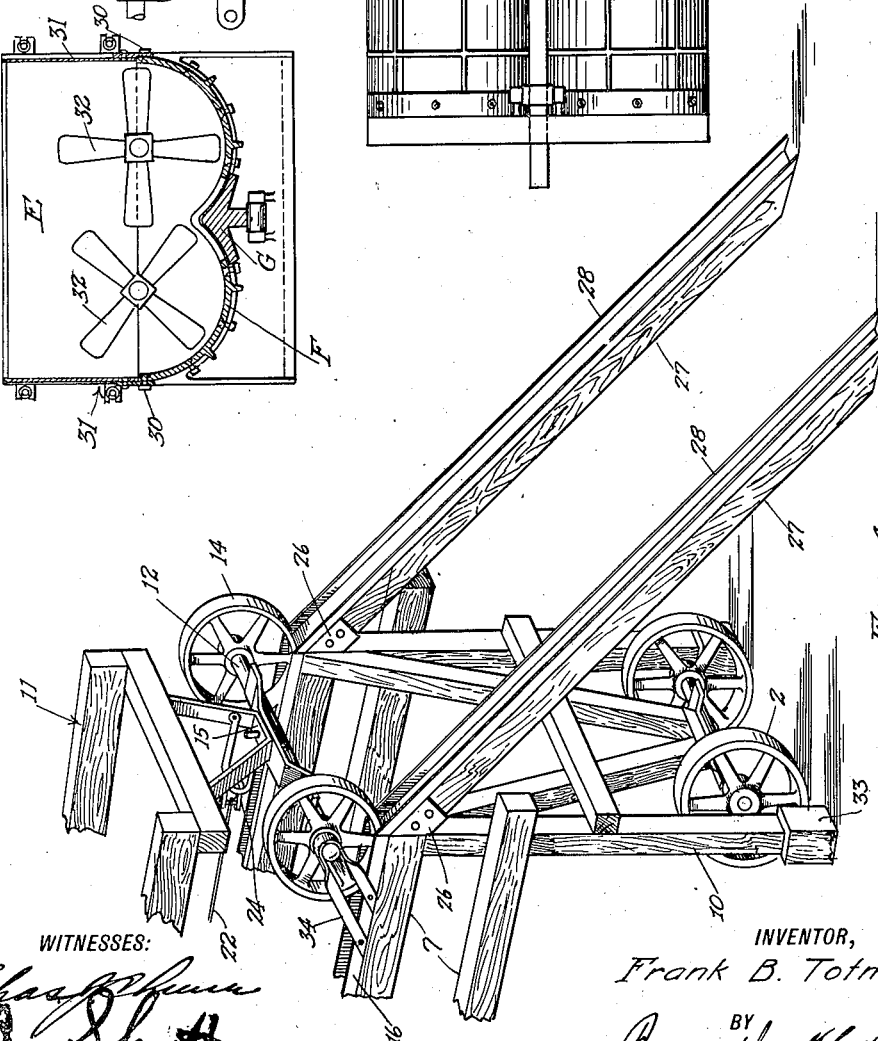

UNITED STATES PATENT OFFICE.

FRANK B. TOTMAN, OF LOS ANGELES, CALIFORNIA.

PORTABLE PAVING PLANT.

1,341,948.

Specification of Letters Patent.

Patented June 1, 1920.

Application filed December 7, 1917. Serial No. 206,116.

*To all whom it may concern:*

Be it known that I, FRANK B. TOTMAN, a citizen of the United States, residing at Los Angeles, in the county of Los Angeles and State of California, have invented new and useful Improvements in Portable Paving Plants, of which the following is a specification.

This invention relates to improvements in paving plants.

The ordinary paving plant is a permanent structure of large proportions and usually equally as high as a two or three story building, thus, paving material made by such a plant must be transported to points where pavement is to be laid and these points of laying pavement are often so far removed from the plant that such transporation by truck or wagon, as is generally the case, is impracticable, involves too great an expenditure, and consumes too great an amount of time, therefore allowing the material to cool to a degree which will render it unfit for immediate application. In most large cities throughout the country paving companies or contractors build large plants, having sufficient capacity to supply their immediate needs as to work contracted for, and in most small paving jobs situated within a reasonable distance of the plants the material made in such plants is hauled to the scene of work by trucks or wagons and thus may be taken hot from the plants and delivered for application while still hot, but where the work contracted for is out of town or a considerable distance from the plants, such, for instance, as a contract for county or state highway paving, it is impossible to transport the material from the plants to the scene of construction and ofttimes it is required that a complete paving plant be constructed adjacent to the scene of paving construction. In some instances contractors and companies will disassemble their already constructed plants and ship them to the points where the new plants are to be constructed, and this method is time consuming, costly and generally objectionable. I am aware of portable paving plants or machines but the capacity of these machines is limited to such extent that their use is of no appreciable avail in supplying paving material for a large job or contract.

What is most required for the purpose of facilitating the carrying out of large paving contracts at points far removed from the main factory or plant, is a portable take-down paving plant which is of such construction that it will have a sufficient capacity to supply the needs of the particular work or job preferably a capacity which substantially equals that of the ordinary permanently constructed paving plant. These requirements are necessary, together with the requirement of mobility of the plant and it is the primary object of my invention to overcome the hereinbefore noted objections and to greatly facilitate paving operations at points far removed from the main factory or plant. To these ends I provide a portable paving plant which is constructed so that it consists of demountable units each capable of independent tractability or portability, the entire portable plant being so relatively constructed and arranged that it may be conveniently and expeditiously assembled or disassembled.

A further object of the invention is to provide a portable paving plant in which the units are provided with wheels so that when disassembled may be independently transported or may be conveniently shipped upon a flat or box car.

A further object of the invention is to provide in connection with a portable paving plant of the character described, means whereby the units of the plant may be readily assembled or disassembled without requiring a great deal of time and labor.

The invention further consists in the particular combination, association, inter-relation and particular construction and relative arrangement of all of the parts, elements, units and features thereof, such as hereinafter defined, illustrated in the accompanying drawings, and finally pointed out in the appended claims.

Other objects and advantages will appear during the course of the following description.

In the drawings:

Figure 1 represents a side elevation of a portable paving plant constructed in accordance with this invention, illustrating the various units of the plant in operative relation, Fig. 2 represents an end elevation of the assembled plant, Fig. 3 represents a side elevation of the plant, showing the same disassembled, one unit thereof being shown as it will appear when assembling or disassembling the plant, Fig. 4 is a fragmentary detail perspective view showing the means for placing one of the units of the plant upon or removing said unit from the other, Fig. 5 is a side elevation of the pug mill construction, Fig. 6 is a fragmentary plan view of the bottom casting of said pug mill, and Fig. 7 is a vertical sectional view taken through the pug mill.

Referring particularly to the drawings which form a part of this specification, and particularly to Figs. 1 and 2, A generally designates a portable paving plant which, aside from its construction which provides for the portable characteristics thereof, embodies the ordinary and well known elements of a paving plant.

The plant consists essentially in two units, designated B and C, respectively, the unit C being adapted to rest upon and be supported by the unit B when the plant is assembled for operation. The lower, or base, unit C comprises a heavy frame construction 1 supported by wheels 2, there being four of such wheels, two upon the front axle 3 and two upon the rear axle 4. This frame 1 preferably comprises front and rear upright members 5 and 6, respectively, and upper horizontal members 7 connected with said upright members. These horizontal frame members 7 are disposed at such an elevation that a truck, wagon or other vehicle which as indicated at D may pass under the same, the front and rear frame members 5 and 6 being likewise spaced apart a sufficient distance to permit of the free passage of the vehicle D beneath said frame members 7. The front axle 3 is connected by a fifth wheel 8 to the upright frame member 5 and there may be provided suitable draft rigging 9. The front member 5 has downward extension portions 10 which are disposed below the upper sides of the wheels 2 on the outsides of the said wheels. These portions 10 are adapted to be blocked under so as to provide for an additional supporting of the unit B and structures supported thereon.

The upper unit C comprises a suitable frame construction generally designated 11, front and rear axles 12 and 13, respectively, and a pair of wheels 14, mounted upon each of said axles, there being a fifth wheel construction 15 connecting the front axle 12 with the frame 11. The upper frame members 7 of the unit B are provided with channel beams 16 which receive the wheels 14 of the unit C when the latter unit is disposed in operaitve position upon the unit B and there are provided means generally designated 17 for holding the unit C in place upon the unit B, such means coöperating with the axles 12 and 13 and frame 1 so as to hold the upper unit C against moving forward or backward.

Having thus briefly described the main paving plant units, such units being of vehicle like construction and adapted for position one upon the other, I will now generally describe the paving plant which in the main is supported by these two vehicle like units B and C. The frame 1, or, more specifically, the frame member 7, supports a pug mill E, said pug mill being of the customary construction save for the bottom member F thereof, which is constructed and arranged in a novel manner, such as will later be more fully described. The pug mill E is particularly illustrated in Figs. 5, 6 and 7 of the drawings and has a trap valve G in its bottom wall so that the paving mixtures or paving material may be allowed to dump into a vehicle disposed beneath such pug mill after a manner shown at D in Fig. 1 of the drawings. A suitable driving means, generally designated H, is mounted upon the frame 1 of the unit B and is in turn driven by a belt I which is operatively associated with a source of power not shown. An asphalt pump J is also mounted upon the frame 1 and may be connected by suitable piping K with an asphalt supply L.

The unit C supports the main mixing bin M, a revolving screen member N disposed above the mixing bin M, such screen member being driven by drive means O, which is operatively associated with the drive means H, by a belt P. By means of a suitable frame extension Q, a bucket elevator R is supported. This elevator is of the type generally used in paving plants and is operatively associated with a drier, not shown, for the material, not shown, that is used to make the paving material. This elevator is removable relative to the frame extension Q so as to facilitate the disassemblage of the units. Supported by the frame 11 of the unit C is a weighing hopper or spout S provided with a valved lower end T. This lower end T is disposed above the pug mill E and may be operated so as to admit or shut off the supply of material which is to be fed to the pug mill. The bin M is provided with a series of valved discharge spouts U, such valved spouts being disposed above the hopper or spout S and provided with the customary operating means. The bin M is divided into sections in the ordinary manner, such as will not need illustration, and such divisions are in communication with respective spouts U. By independently operating the spouts U as is ordinarily done in paving plants, the amount of different grades of material admitted to the hopper S may be regulated at will. Any suitable means such as that designated V may be used for suspending the hopper S from the drum so that a weighing action will take place and the indicator or scale W carried by the hopper will indicate the weight of the material in said hopper. This construction is such as generally used in paving machines and forms no part of this invention, the description thereof being given to make clear the purpose of the present invention and the operation thereof. The piping K for connecting the pump J with the supply of asphalt L extends above the units B for coöperation with a tiltable asphalt feed bucket X suspended from the frame 11 of the unit C in the customary manner. This pipe is so arranged as to provide for a circulatory asphalt feed relative to the discharge spout. There is provided a valved discharge spout Y in the piping K, such spout being disposed so as to discharge into the bucket X and said bucket X is disposed so that the contents thereof may be poured into the pug mill E. It is thought unnecessary to further describe the paving plant elements illustrated and which not illustrated will coöperate with the illustrated elements, inasmuch as these subject matters do not constitute parts of this invention but are described merely to show how the various machine and operating elements of a paving plant are in this invention disposed so that a unitary portable plant may be provided, said units being each independently portable.

Taking up the description of the unit B, said unit is preferably provided with a collapsible operator's platform 18 which extends along one side thereof and there may be provided a similar platform 19 upon the other side. A winch 20, provided with hand operating means 21, is preferably supported upon the upright frame member 6 and provides a means for pulling the upper unit C into place and allowing said unit to be lowered from supporting position upon the main unit B. There is provided a cable 22 which is operatively associated with the winch 20 and extends over a pulley 23 removably supported upon the pug mill E. This pulley is taken down when the parts are assembled. This cable is adapted to be attached to suitable draft rigging 24, that is attached to the front part of the frame 11. On the forward ends of the upper frame members 7 there is provided means for supporting an inclined run way generally designated 25. This means preferably consists of downwardly off-set extensions 26 of the channel beams 16, and the run way 25 preferably consists of two longitudinal beams 27, each having a channel beam track member 28 fixed to its upper side. These beams 27 are removably secured within the extensions 26 by means of bolts 29 and are adapted at their other ends to rest upon the ground.

The pug mill E as shown, is provided with a removable bottom F, such bottom being preferably in the form of a casting provided with a central opening to accommodate the trap or valve means G. This bottom member F is removably bolted as at 30 to the casing 31 of the pug mill and when worn, due to the action of the paddles 32 of the pug mill, may be removed and replaced with a new casting. The provision of a cast iron removable bottom for the pug mill is considered an essential feature of this invention, and an improvement over the prior art relative to pug mills, inasmuch as prior constructions embody sectional plate construction, said sectional plates being riveted together and forming a permanent bottom, making the replacement of a new bottom extremely difficult and expensive.

Assuming that the main units B and C are disposed upon the ground or other support in dismantled or disassembled relation, the said units are free to be transported as desired, and take up comparatively little room. When these units are disassembled they may be connected to one another and rolled or pulled by a suitable tractor over roads of any description. During the individual transporting of the units A and B such elements of the plant as the weighing hopper S, the bucket X and the elevator R are removed from the unit C so as to not interfere with the transporting thereof and these elements may be suitably carried as they are not bulky nor unusually large, in a truck, trailer or the like. The piping K is disconnected from the pump and the asphalt supply L is preferably supported upon wheels as at 31 so that it, too, is free to be transported. The members 27 are removed from the extensions 26 and may be placed upon the unit B to be transported therewith. Likewise the connection or belt I with the source of power, not shown, is removed from the driving means H. It will be readily seen that the paving plant essentially as a whole is supported by the two vehicle like units A and B, and as each of such units is capable of being transported, the transporation of the entire plant may be readily and easily effected through the individual transportation of each unit, with much more facility than the ordinary paving plant structure which, when removed, has to be disassembled, dismantled and torn down in about the same manner as is the case in tearing down a house or factory.

When it is desired to assemble the plant, the unit B is brought into suitable position to support the unit C and to dispose the elements supported by both units in position for coöperation, preferably the extension members 10 being blocked up, as at 33, so as to relieve the strain of the load upon the front axle 3 and fifth wheel 8. The run way is next positioned, this being done by fitting certain ends of the beams 27 within the extensions 26 and inserting the bolts 29 in place through said extensions and the beams. The other ends of the beams or members 27 will rest upon the ground and said ends are preferably beveled or chamfered. The unit C is next wheeled into position to mount the run way, the rear wheels 2 being disposed in alinement with said members 27 of the run way and the cable 22 is passed over the pulley 23 and connected with the draft means 24, associated with the front end of the frame 11 of the unit C. The winch 20 is operated by the means 21 or, if desired, suitable power means, not shown, may be employed. As the cable is wound upon the winch, unit C is pulled or caused to traverse over the run way and to assume its properly supported position upon the frame member 7, the wheels 14 of the unit C being disposed within the channel beams 16. The means 17 for holding the unit C in place is then positioned for such holding action. This means preferably consists of strap irons 34 which are of approximate U-shape, extended over the extremities of the axles 12 and 13 and bolted as at 35 at their extremities to the flanges of the channel beams 16. The elevator R is next mounted upon the frame extension Q of the unit C and operatively associated with screen N and supply of material to be elevated to said screen and utilized in making the paving material, said supply being delivered from a drier, not shown, such drier being customarily provided in paving plants. The run way 25 may be removed, if desired, but if the disassembling of the plant is to take place within a short time for the purpose of transporting the same elsewhere said run way is allowed to remain in position. The asphalt supply L is next positioned relative to the plant so that the piping K may be connected with the pump J and valved outlet Y. The source of power, not shown, for operating the various rotary elements of the plant may consist of a wheeled plant and is connected with the drive means H by the belt or drive member I. The weighing hopper S and feed bucket X are next properly suspended from the unit C and the belt or drive means P is operatively associated with the drive means H and O, so as to operate the screen N. Such other operative connections as are necessary between the elements supported by the units B and C may be made if required, only the essential operative connections being described herewith. The operation of manufacturing the paving material is carried out in the same manner as is employed in the stationary and permanent plants, such as are in general use throughout the country. The material for admixture with the asphalt is conducted to the screen N by the elevator R and said screen divides or separates the material into grades, such grades being stored within the sectional bin M. The operator, by opening the valved spouts U, allows the material to deposit into the weighing hopper or spout S and the quantity of such material and weight thereof may be determined by the scale or indicator W. The valved lower end T is opened and the material is allowed to drop into the pug mill E. The valved spout Y is opened and asphalt from the supply L flows into the feed bucket X. This bucket is tilted after being sufficiently filled so as to pour the asphalt into the pug mill and the agitating or mixing paddles 32 produce the paving material. A suitable wagon or vehicle adapted to transport the material is driven under the pug mill between the wheels 2 and frame members 5 and 6 of the unit B. The trap or valve member G in the pug mill bottom may be opened and the paving material will be discharged into the wagon D. The foregoing description is that of the operation of the ordinary paving plant and is given merely to indicate how the paving plant constructed in accordance with this invention is essentially constructed.

To disassemble the plant, the connections between the paving plant elements which are supported by the respective units are removed and the locking means 17 is likewise removed. The unit B is then free to be lowered upon the run way 25 and this lowering may be readily, safely and easily effected by the winch and cable means provided for such purpose.

With reference to the foregoing description and accompanying drawings, it will be observed that I have provided a paving plant of such unitary and particular construction that the same may be dismantled and the dismantled parts thereof are constructed so that they are capable of independent traction. In this way I may provide a paving machine which is exceptionally mobile and capable of being transported over ordinary vehicle roads for great distances, the size of the machine being of no moment, it being possible, therefore, to provide a machine having a capacity as great as that of any stationary and permanent paving plant.

While the foregoing description, accompanying drawings and appended claims refer to the preferred embodiment of my invention it is to be understood that I may make minor changes as to details of construction, size and proportion and relative arrangement of parts, all without departing from the true spirit and scope of the invention thereof as defined herein.

Another of the essential features of the invention is the provision of a portable paving plant, in which the main plant elements or units are so constructed, relatively arranged supported and associated, that said machine elements may be inter-associated or dis-connected at will without removal thereof from the units or elements, or the expenditure of much time or labor, and so that said machine elements will coöperate reliably and effectively in their functions to produce paving material. Thus it will be seen that I have provided essentially two main elements or units which, when disassembled are capable of independent traction, and which are adapted to be disposed one upon the other or in superposed relation so that the main machine elements of the paving plant supported respectively thereby may be properly inter-associated to produce a partially complete and unitary paving plant, the positioning of said main elements or units one upon the other providing for space economy.

Having thus disclosed my invention, I desire and claim by Letters Patent:

1. A portable paving plant, comprising vehicle-like units each adapted for traction and being equipped with elements of a paving plant, means for holding one of said units upon and in superposed relation to the other of said units, said elements being formed and adapted for associated use in producing paving material, one of said units having wheels spaced apart sufficiently to permit a vehicle to pass between said wheels and beneath one of the elements for making paving material, whereby paving material may be released from said element and deposited into said vehicle.

2. In a portable paving plant, a vehicle-like unit comprising upright frame members, wheels supporting said upright frame members, other frame members connecting said upright frame members above the wheels, all of said frame members and the wheels being spaced apart sufficiently to permit a vehicle to pass between the wheels and beneath said last named frame members, another vehicle-like unit comprising a frame and wheels supporting said frame, said last named unit being adapted to be assembled in superposed relation to and upon said first named unit, both said units being capable of independent traction; in combination with elements mounted respectively upon said units and capable of associated use in producing paving material.

In testimony whereof, I have signed my name to this specification in the presence of two subscribing witnesses.

FRANK B. TOTMAN.

Witnesses:
  CHAS. J. CHUNN,
  RAYMOND IVES BLAKESLEE.